2,946,824
Patented July 26, 1960

2,946,824
ALKYLBENZYLTRIPHENYLPHOSPHONIUM CHLORIDES

Max E. Chiddix, Easton, and Earl P. Williams, Pen Argyl, Pa., assignors to General Aniline & Film Corporation, New York, N.Y., a corporation of Delaware No Drawing. Filed Oct. 15, 1958, Ser. No. 767,294

6 Claims. (Cl. 260—606.5)

The present invention relates to a new class of quaternary compounds having new and valuable industrial and agricultural uses. It relates more particularly to a new class of alkylbenzyltriphenylphosphonium chlorides.

We have found that a new class of quaternary compounds having the following general formula:

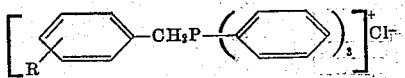

wherein R represents an alkyl group of 8 to 18 carbon atoms, are particularly effective as insecticides. They are readily prepared by condensing 1 mole of an alkylated benzyl chloride with 1 mole of triphenylphosphine in the presence of chlorobenzene as an inert solvent diluent and at a temperature ranging from 145–160° C. for a period of time ranging from 2 to 4 hours.

As examples of o-, m- and p-alkylated benzyl chlorides that may be condensed with triphenylphosphine, the following are illustrative:

Octylbenzyl chloride
Nonylbenzyl chloride
Decylbenzyl chloride
Hendecylbenzyl chloride
Dodecylbenzyl chloride
Cetylbenzyl chloride
Octadecylbenzyl chloride The following examples will illustrate the manner in which the alkylbenzyltriphenylphosphonium chlorides are prepared and utilized as valuable agricultural chemicals having new and unexpected properties.

EXAMPLE I

Into a 500 ml. flask equipped with a stirrer, thermometer and condenser were placed 78.6 grams (0.3 mole) of triphenylphosphine, 88.3 grams (0.3 mole) of p-dodecylbenzyl chloride and 83.5 grams of monochlorbenzene. The charge was heated to reflux at 150–157° C. and held at this temperature for a total of 2½ hours. The contents of the flask were then cooled and dissolved in 450 ml. of carbon tetrachloride with gentle warming. The reaction mixture was then cooled (5° C.) in an ice bath and filtered. The white crystalline solid after washing with a commercially available high boiling petroleum ether was dried in an oven at 100° C. The resulting dodecylbenzyltriphenylphosphonium chloride is soluble in water.

EXAMPLE II

Example I was repeated with the exception that the following reactants were employed:

A charge was prepared consisting of 78.6 grams of triphenylphosphine, 71.4 grams of p-octylbenzyl chloride and 80 grams of monochlorbenzene. The charge was heated to reflux for 2½ hours at 150° C. After cooling, filtering, washing with petroleum ether and drying, the white crystalline solid is soluble in water.

EXAMPLE III

Example I was again repeated with the exception that the charge of coreactants consisted of 78.6 grams of triphenylphosphine, 113.4 grams of m-octadecylbenzyl chloride and 100 grams of monochlorbenzene. The charge was heated to reflux for 3 hours at 150° C. After cooling, filtering and washing with petroleum ether followed by drying, the white crystalline solid is soluble in water.

By following the procedure of Example I, 88.3 grams of dodecylbenzyl chloride were replaced by an equivalent amount of p-nonylbenzyl chloride, p-decylbenzyl chloride, p-hendecylbenzyl chloride and m-cetylbenzyl chloride respectively, to yield the following white crystalline solids which are water soluble:

p-Nonylbenzyltriphenylphosphonium chloride
p-Decylbenzyltriphenylphosphonium chloride
p-Hendecylbenzyltriphenylphosphonium chloride
m-Cetylbenzyltriphenylphosphonium chloride In order to determine whether the foregoing alkylbenzyltriphenylphosphonium halides were efficient as insecticides, the following test procedure was resorted to:

Concentrates of the alkylbenzyltriphenylphosphonium halides of the foregoing examples were made to contain the following ingredients:

Alkylbenzyltriphenylphosphonium chloride _____ grams__ 0.2
Acetone _____ ml__ 10
Water soluble surface active agent _____ ml__ 0.02
Water sufficient to make _____ ml__ 100

It is to be noted that the nature or character of the water soluble surface active agent is immaterial so long as it is water soluble and functions as a surfactant. Materials of this type are legend and can be very readily selected by the user. For the purpose of the following tests, we employed a commercial surfactant bought on the market under the brand name of "Triton X–155."

The water solution as prepared above was used in all of the following screening tests:

Test insect

Fourth instar larvae of the Mexican bean beetle, *Epilachna varivestis*, less than one day old within the instar and reared on tender green beans under greenhouse conditions, constitute the test insect for this screening method. The test larvae are removed from the colony and held without food, in a glass dish, for 4 hours prior to being placed on the treated foliage.

Application of toxicant

Paired seed leaves, excised from tender green bean plants, are dipped in the test formulations until they are thoroughly wetted. Excess liquid is removed by gentle shaking. While the leaves are drying in a ventilated hood, wilting is prevented by placing the stem in water. When dry, the paired leaves are separated and each is placed in a 9 cm. Petri dish lined with filter paper. Ten randomly selected larvae are introduced before closing the dish.

Holding conditions

The closed dishes are labeled and held at 75 to 85° F. for 3 days. Although the larvae can easily consume the whole leaf within 24 hours no more food is added. Check larvae remain vigorous during the entire holding period and do not advance to the quiescent pre pupae state. The holding time cannot be reduced to less than 3 days without sacrificing ease of reading the percentage mortality.

Record of results

Larvae which are unable to move the length of the body (translocate) even upon stimulation by prodding, are considered dead. Possible repellent qualities of the test compounds are recorded as percentage feeding inhibition. While not excluding the possibility of contact insecticidal action, this test will indicate chemicals which display repellent or stomach poison effects in the contact action.

Concentration of toxicant

The test compounds are formulated by a standard procedure of solution in acetone, addition of an emulsifier (surfactant) and dilution with water. Primary screening tests are run at 2000 p.p.m.

Results of tests

| Alkylbenzyltriphenylphosphonium Chloride | p.p.m. | Living | Dead | Percent Control | Rating | Percent Feeding Inhibition |
|---|---|---|---|---|---|---|
| dodecylbenzyltriphenylphosphonium chloride | 2,000 | 2 | 8 | 80 | Good | 95 |
| octylbenzyltriphenylphosphonium chloride | 2,000 | 2 | 8 | 80 | do | 95 |
| octyldecylbenzyltriphenylphosphonium chloride | 2,000 | 2 | 8 | 80 | do | 95 |
| nonylbenzyltriphenylphosphonium chloride | 2,000 | 2 | 8 | 80 | do | 95 |
| decylbenzyltriphenylphosphonium chloride | 2,000 | 2 | 8 | 80 | do | 95 |
| hendecylbenzyltriphenylphosphonium chloride | 2,000 | 2 | 8 | 80 | do | 95 |
| cetylbenzyltriphenylphosphonium chloride | 2,000 | 2 | 8 | 80 | do | 95 |
| Lindane | 350 | 1 | 9 | 90 | Very good | 97 |
| Blank Control | | 10 | 0 | 0 | | |
| benzyltriphenylphosphonium chloride | 2,000 | 6 | 3 | 30 | Unpromising | 10 |

Solvents which may be employed in preparing insecticidal solutions are water, refined petroleum distillates, liquid halogenated hydrocarbon compounds, such as carbon tetrachloride, chloroform, ethylene chloride, chlorobenzene, hydrocarbon compounds, such as benzene and toluene; lower aliphatic alcohols, such as methyl, ethyl or propyl alcohol.

Solid inert carriers, such as tentonite, diatomaceous earth, wood flour, etc. may also be employed for use in dusting powders. The quantity of carrier whether liquid or solid can be varied between wide limits depending upon the strength of the insecticide desired in the composition, preferably from .01 to 20%.

We claim:

1. Alkylbenzyltriphenylphosphonium chlorides having the following general formula:

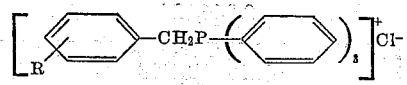

wherein R represents an alkyl group containing from 8 to 18 carbon atoms.

2. p-dodecylbenzyltriphenylphosphonium chloride.
3. p-octylbenzyltriphenylphosphonium chloride.
4. m-octadecylbenzyltriphenylphosphonium chloride.
5. p-decylbenzyltriphenylphosphonium chloride.
6. m-cetylbenzyltriphenylphosphonium chloride.

References Cited in the file of this patent

Michaelis: "Ann. der Chemie," Band 229, page 320 (1885).

Kosolapoff: "Organophosphorus Compounds," John Wiley & Sons, Inc., New York (1950), page 90.

Wertheim: "Textbook of Organic Chemistry," 3rd edition, McGraw-Hill Book Co., Inc., New York (1951), pages 456–8.